United States Patent [19]
Henderson

[11] 3,798,530
[45] Mar. 19, 1974

[54] STATIC SWITCH CIRCUIT

[75] Inventor: Ross Henderson, North Reading, Mass.

[73] Assignee: Gould Inc., Mendota Heights, Minn.

[22] Filed: Oct. 17, 1972

[21] Appl. No.: 298,370

[52] U.S. Cl. .................. 321/11, 317/33 SC, 321/19
[51] Int. Cl. ............................................. H02h 7/14
[58] Field of Search ............. 321/11, 12, 19, 13, 14; 317/33 SC

[56] References Cited
UNITED STATES PATENTS
3,252,073  5/1966  Maine .............................. 321/14 X
3,684,936  8/1972  Graf ................................. 321/11 X

*Primary Examiner*—James D. Trammell
*Attorney, Agent, or Firm*—Daniel Jay Tick

[57] ABSTRACT

A static switch circuit for switching off a failed inverter of a power supply circuit includes a pair of inverters, each driven by a DC input, and a load supplied by the inverters. The static switch circuit is connected between the inverters and the load and comprises a pair of fault detectors, each having inputs connected to the output of a corresponding one of the inverters and outputs for detecting a fault occuring in the corresponding inverter. Each of a pair of interrupters is connected between the output of the fault detector and the output of the corresponding one of the inverters and the load for instantaneously switching off an inverter in which a fault occurs and is detected by the fault detector. Each of a pair of forced commutated circuits is connected with a corresponding one of the interrupters for reducing the period of time in which the corresponding interrupter switches off the corresponding inverter.

7 Claims, 9 Drawing Figures

STATIC SWITCH CIRCUIT

FIG. 1

MAIN SWITCH PART OF STATIC SWITCH CIRCUIT

FORCED COMMUTATION PART OF STATIC SWITCH CIRCUIT

FIG. 4

LOGIC FLIP FLOP

SQUARE WAVE DETECTOR
FIG. 7

HIGH SPEED SENSOR
FIG. 8

OVERCURRENT SENSOR
FIG. 9

STATIC SWITCH CIRCUIT

BACKGROUND OF THE INVENTION

The present invention relates to a static switch circuit. More particularly, the invention relates to a static switch circuit for instantaneously switching a replacement inverter or an alternate source of power into circuit when an inverter in the circuit fails and disconnecting the failed inverter.

When an inverter in circuit fails, it may cause considerable difficulties due to the resultant failure to continuously supply power to the circuit. Thus, for example, in a computer, if any part of the cycle is lost, due to any cause such as inverter failure, the computer program would be lost.

The principal object of the invention is to provide a static switch circuit for instantaneously switching a replacement inverter into circuit, thereby maintaining an uninterrupted load voltage, when an inverter in the circuit fails, and disconnecting the failed inverter.

An object of the invention is to provide a static switch circuit for switching a replacement inverter into circuit, without the loss of any part of a cycle, when an inverter in the circuit fails.

Another object of the invention is to provide a static switch circuit for switching in an alternate source of power such as, for example, commercial AC power, without the loss of any part of a cycle, when an inverter in the circuit fails and disconnecting the failed inverter.

Still another object of the invention is to provide a static switch circuit of simple structure, which is inexpensive in manufacture and which oprates with efficiency, effectiveness and reliability to substantially instantaneously switch a replacement inverter or alternate source of power into circuit and disconnect the failed inverter when an inverter in the circuit fails.

Yet a further object of the invention is to provide a static switch circuit which operates in a period of 1 to 100 microseconds to switch an alternate source of power into circuit and disconnect the failed inverter when an inverter in the circuit fails.

The basic function of the static switch circuit of the invention is to disconnect or switch off one of the inverters supplying power to the load when such inverter fails and to switch in an alternate source of power. The switch circuit of the invention is a static switch circuit because its main power components are static components. Thus, the silicon controlled rectifiers and the diodes utilized in the static switch circuit of the invention are static components. Furthermore, as utilized herein, the term static switch is intended to mean a switch in which the power is supplied from one source in one condition and is supplied from another source in the other condition.

In static switches, in most cases, the switching times are related to the turn off time. This is in the range of 200 microseconds in the static switch circuit of FIG. 3 of the present invention. In a mechanical contactor, for example, the switching time is in the range of one full cycle of a 60 Hertz frequency.

The static switch circuit of the invention utilizes silicon controlled rectifiers or SCRs, since they are less susceptible to transients than are transistors, although a transistor circuit may have a higher speed of operation. Furthermore, SCRs can be operated at extremely higher power levels than transistors.

There are basically two methods of switching static interrupters.

BRIEF SUMMARY OF THE INVENTION

In accordance with the invention, a static switch circuit for switching off a failed inverter of a power supply circuit including a pair of inverters, each driven by a DC input, and a load supplied by the inverters, is connected between the inverters and the load. The static switch circuit comprises a pair of fault detecting means each having input means connected to the output of a corresponding one of the inverters and output means for detecting a fault occurring in the corresponding inverter. Each of a pair of interrupting means is connected between the output means of the fault detecting means and the output of the corresponding one of the inverters and the load for substantially instantaneously switching off an inverter in which a fault occurs and is detected by the fault detecting means. Each of a pair of forced commutation means is connected with a corresponding one of the interrupting means for reducing the period of time in which the corresponding interrupting means switches off the corresponding inverter.

Each of the fault detecting means comprises square wave detecting means for detecting a decaying square wave in the corresponding inverter, high speed sensing means for sensing a high speed discontinuity of the output sine wave of the corresponding inverter, and slow AC failure detecting means for detecting a slow AC delay.

Each of the interrupting means comprises a silicon controlled rectifier for substantially instantaneously disconnecting the corresponding inverter from the circuit upon the occurrence of a failure therein.

Each of the forced commutating means comprises circuit means for forcing current back through the junction of the silicon controller rectifier when the silicon controlled rectifier gate drive is removed. The circuit means comprises a second silicon controlled rectifier.

BRIEF DESCRIPTION OF THE DRAWINGS

In order that the invention may be readily carried into effect, it will now be described with reference to the accompanying drawings, wherein:

FIG. 9 is a circuit diagram of an overcurrent sensor which may be utilized as the overcurrent sensor 97a.

In the FIGS., the same components are identified by the same reference numerals.

DETAILED DESCRIPTION OF THE INVENTION

Figure 1:
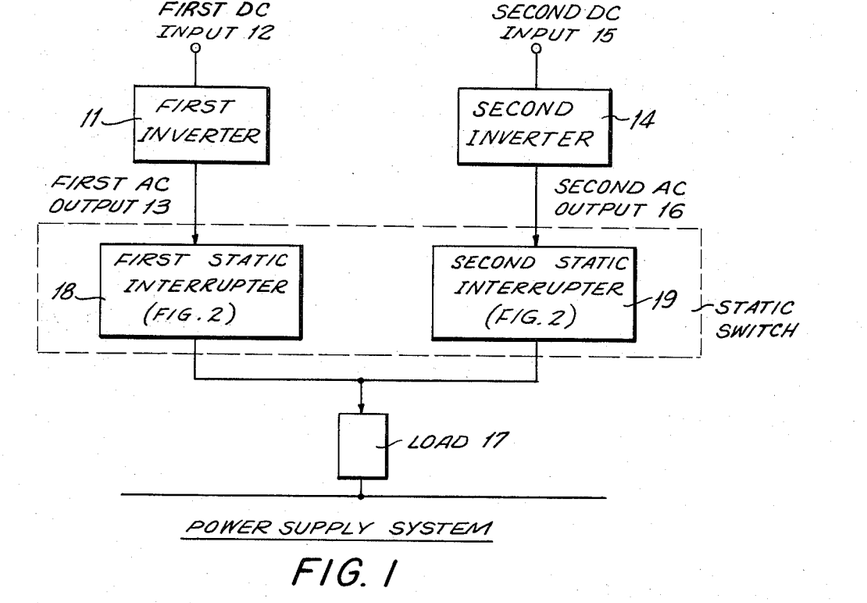
FIG. 1 is a block diagram of a power supply system incorporating the static switch circuit of the invention.

A basic power supply system of the type utilizing the static switch circuit of the invention is shown in FIG. 1. The system of FIG. 1 utilizes two inverters connected in parallel, although, of course, any suitable number of inverters or commercial AC power may be connected in the circuit. Thus, a first inverter 11 is supplied with a DC voltage from a first DC input 12 and produces a first AC output voltage 13. A second inverter 14 is supplied with a DC voltage from a second DC input 15 and produces a second AC output voltage 16.

The first and second inverters 11 and 14 operate into a load 17 via a first static interrupter 18 and a second static interrupter 19. Each of the static interrupters 18 and 19 is self-supporting, since it has its own power supply and its own logic networks, comprising the power supply circuit of FIG. 6 and the circuits shown in FIGS. 2 and 5, necessary to detect a failure of the corresponding inverter and to disconnect such inverter without disruption of the system.

The inverters 11 and 14 are generally supplied from a DC battery bus, backed by a battery charger. The output of each inverter 11 and 14 is usually single phase 120 volts, but may be three phase, which is applied to the load via the static interrupters 18 and 19 and thus applies 120 volts AC power to the load 17. In an interrupter system, the inverters operate in parallel, but in a static switch system they do not operate in parallel. However, it is necessary that when the source supplying the load is switched, the inverters be synchronized. The inverters may be synchronized by any suitable means. The end result is that in normal operation, with both inverters 11 and 14 supplying the load 17, they share the load equally. An inverter may also be synchronized to a commercial power source, in a static switch system. When the inverter fails, the commercial power source may be switched into the system.

Figure 2:
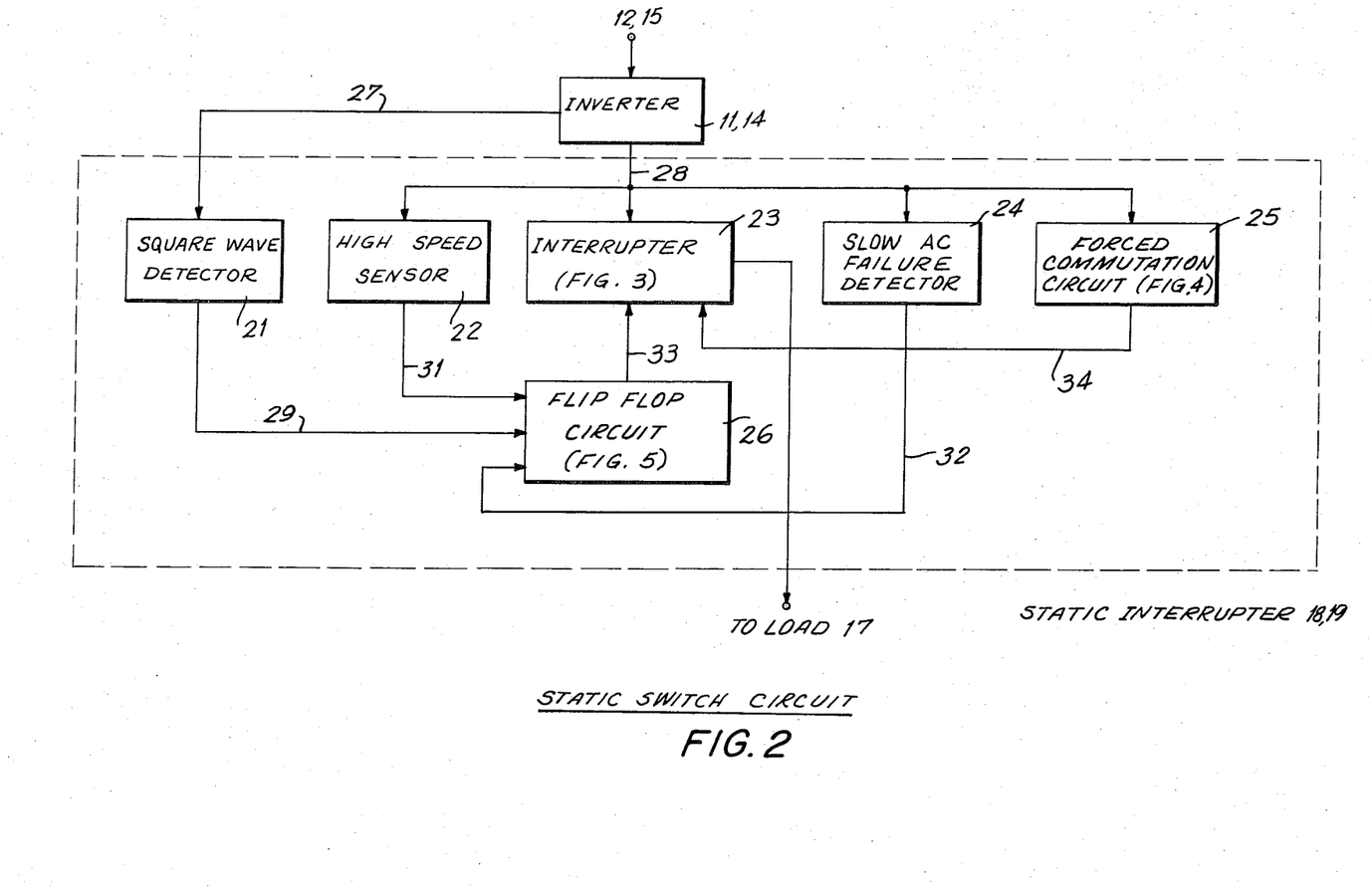
FIG. 2 is a block diagram of the static switch circuit of the invention.
Figure 3:
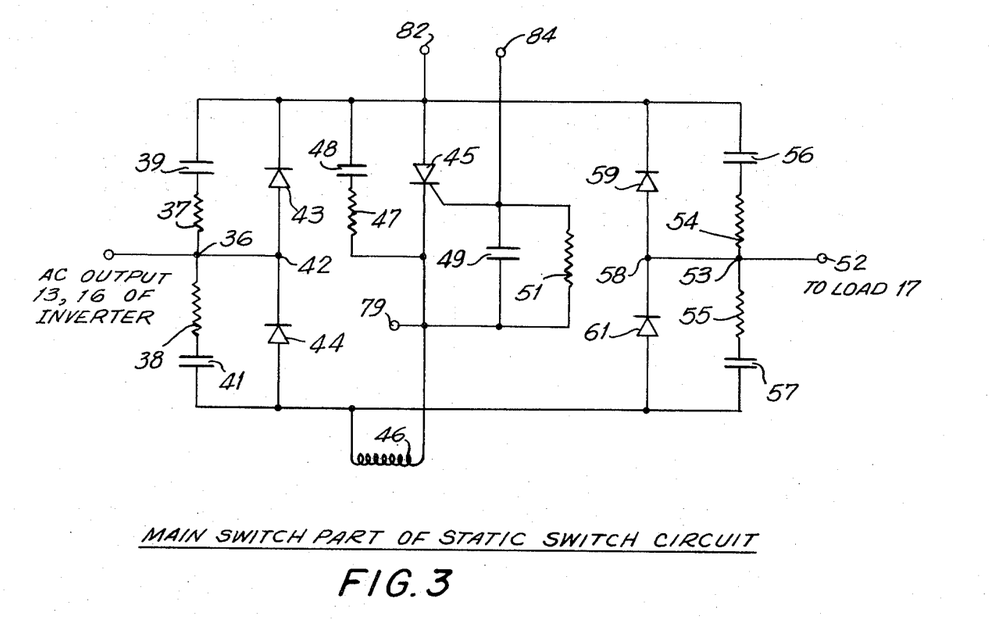
FIG. 3 is a circuit diagram of the main switch part of an embodiment of the static switch circuit of the invention.
Figure 4:
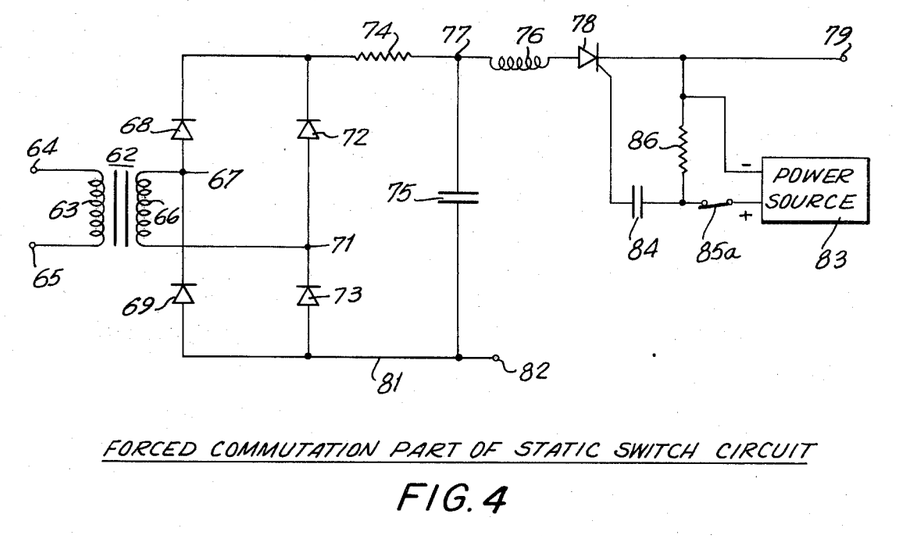
FIG. 4 is a circuit diagram of the forced commutation part of the static switch circuit of the invention.
Figure 5:
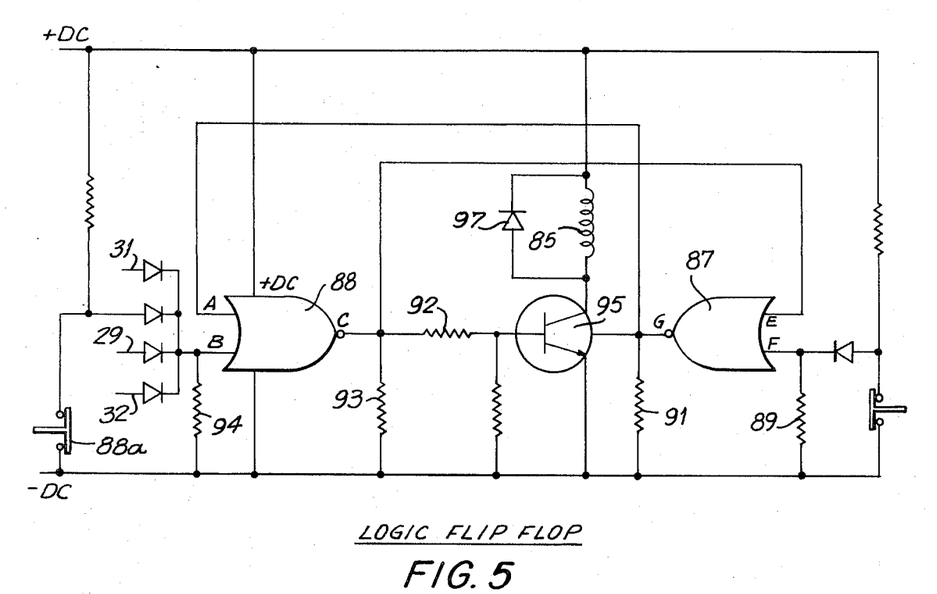
FIG. 5 is a circuit diagram of an embodiment of a logic flip flop circuit of the static switch circuit of the invention.

In the static switch circuit of FIG. 2, each static interrupter 18 and 19 comprises a square wave detector 21, a high speed sensor 22, an interrupter 23, a slow AC failure detector 24, a commutation circuit 25 and a flip flop circuit 26. A power circuit diagram of the interrupter 23 is shown in FIG. 3. A circuit diagram of the forced commutation circuit 25 is shown in FIG. 4. A circuit diagram of the flip flop circuit 26 is shown in FIG. 5.

In the circuit arrangement of FIG. 2, the inverter 11 or 14 has an input connected to the DC input 12 or 15, respectively. The inverter 11 or 14 has the square wave connected to the input of the square wave detector 21, via a lead 27, and another output connected in common to an input of each of the high speed sensor 22, the interrupter 23, the slow AC failure detector 24 and the commutation circuit 25, via a lead 28.

The square wave detector 21 has an output connected to an input of the flip flop circuit 26 via a lead 29. The high speed sensor 22 has an output connected to another input of the flip flop circuit 26 via a lead 31.

The slow AC failure detector has an output connected to still another input of the flip flop circuit 26 via a lead 32. The flip flop circuit 26 has an output connected to another input of the interrupter 23 via a lead 33. the commutation circuit 25 has an output connected to another input of the interrupter 23 via a lead 34.

Figure 7:
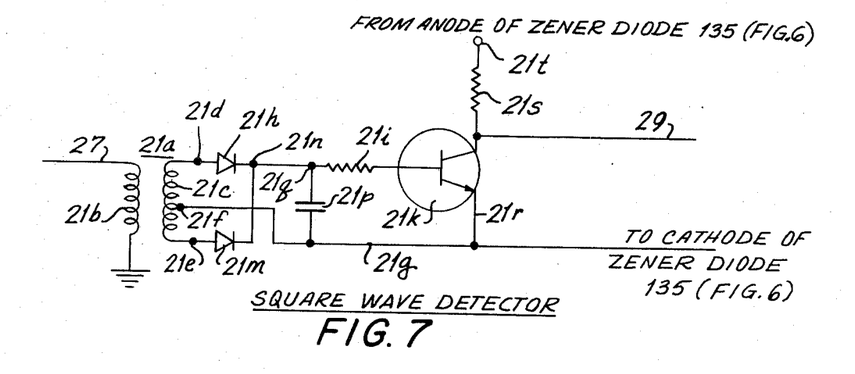
FIG. 7 is a circuit diagram of a square wave detector which may be utilized as the square wave detector 21.
Figure 8:
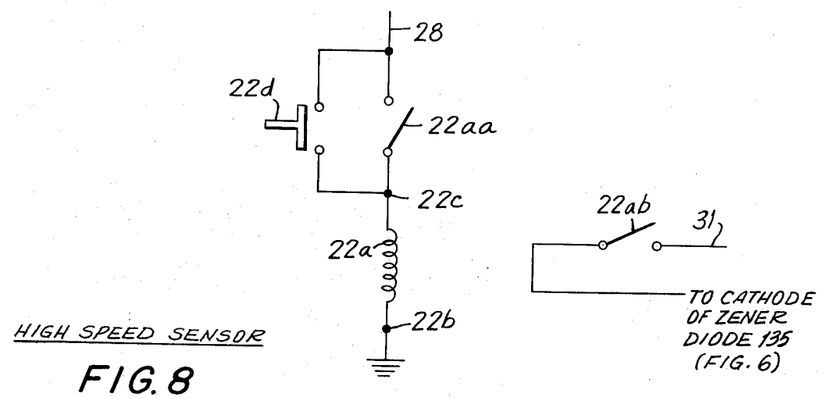
FIG. 8 is a circuit diagram of a high speed sensor which may be utilized as the high speed sensor 22.

The square wave detector 21 may comprise any suitable circuit for detecting a square wave. A suitable square wave detector circuit is shown in FIG. 7. The slow AC failure detector 24 may comprise any suitable circuit for detecting a slow AC decay. The high speed sensor 22 may comrpise any suitable circuit for sensing a high speed discontinuity of the output sine wave of the inverter 11 or 14. A suitable high speed sensor circuit is shown in FIG. 8. A simple relay may function as a suitable slow AC failure detector.

When an inverter 11 or 14 fails, the resultant effect is that of one of said inverters feeding power into the other. In accordance with the invention, as soon as the failure of one of the inverters 11 and 14 is detected, such inverter is taken off the line or out of the circuit, and the other of said inverters is connected into the circuit.

The square wave detector 21 determines if the square wave generated in the inverter 11 or 14 is decaying. If the square wave is decaying, the square wave detector produces a fault signal. The fault signal is fed to the flip flop circuit of FIG. 5. This is hereinafter described with reference to FIG. 6.

The slow AC failure detector 24 detects when the AC output 13 or 16 of the inverters 11 or 14, respectively, decays slowly. The high speed sensor 22 cannot provide such an indication, but the AC failure detector 24 does and transfers a logical signal to the flip flop of FIG. 5 and then transfer power from one gate to the other, forces that silicon controlled rectifier to switch OFF and switches the silicon controlled rectifier of the alternate power source ON.

The detection of a square wave in the output of the inverter 11 or 14 by the square wave detector 21, the detection of a discontinuity in the output sine wave of said inverter, or the detection of a slow decay in the AC output of said inverter actuates the interrupter 23 via the flip flop circuit 26.

FIG. 3 illustrates an embodiment of the static switch circuit of the invention. In FIG. 3, an input terminal 35, which is connected to the output of the inverter 11 or 14, is connected to a common point 36 in the connection between a resistor 37 and a resistor 38, which are connected in series with capacitors 39 and 41. The input terminal 35 is also connected to a common point 42 in the connection between a pair of diodes 43 and 44 connected in series with each other. The series connection of diodes 43 and 44 is connected in parallel with the series connection of resistors 37 and 38 and capacitors 39 and 41.

A silicon controlled rectifier or SCR 45 is connected in series with an inductor 46 and the series connection is connected in parallel with the series connections 37, 38, 39, 41 and 43, 44. A resistor 47 and a capacitor 48, connected in series therewith, are connected in shunt with the SCR 45. A resistor 49 and a capacitor 51 are connected in parallel with each other, and the parallel connection is connected between the gate, control electrode or firing electrode of the SCR 45 and a common point in the connection between said SCR and the inductor 46.

An output terminal 52, which is connected to the load 17, is connected to a common point 53 in the connection between a resistor 54 and a resistor 55, which are connected in series with capacitors 56 and 57. The output terminal 52 is also connected to a common point 58 in the connection between a pair of diodes 59 and 61 connected in series with each other. The series connections 37, 38, 39, 41 and 43, 44 and 59, 61 and 54, 55, 56, 57 are connected in parallel with each other.

The resistors 37, 38, 47, 54 and 55 and the capacitors 38, 39, 48, 49, 56 and 57 are primarily utilized for transient suppression and are not necessary for overall static interrupter or switching operation. The input power flow is via the diode 43, the SCR 45, the inductor 46 and the diode 53 in the positive half cycle of the sine wave. The input power flow is via the diode 52, the SCR 45, the inductor L1 and the diode 44 in the negative half cycle of the sine wave.

When the gate drive is applied to the control electrode or gate of the SCR 45, the static switch circuit functions as a closed switch and power flows from the inverter 11 or 14 to the load 17, as shown in FIG. 3.

When the gate drive is removed from the SCR 45, the static switch circuit functions as an open switch, with said SCR turning OFF within half a cycle. In accordance with the invention, the switching turn off time is considerably shortened by utilizing forced commutation. FIG. 4 shows the forced commutation part of the static switch circuit of the invention.

In FIG. 4, a transformer 62 has a primary winding 63 having input terminals 64 and 65, and a secondary winding 66. One end of the secondary winding 66 is connected to a common point 67 in the connection between a diode 68 and a diode 69, which are connected in series. The other end of the econdary winding 66 is connected to a common point 71 in the connection between a diode 72 and a diode 73, which are connected in series. The series connection 68, 69 and the series connection 72, 73 are connected in parallel with each other.

A resistor 74 and a capacitor 75 are connected in series and such series connection is connected in parallel with the series connections 68, 69 and 72, 73. One end of a choke 76 is connected to a common point 77 in the connection between the resistor 74 and the capacitor 75. The other end of the choke 76 is connected to the anode of a silicon controlled rectifier or SCR 78.

The resistor 74 functions as a current limiter. The capacitor 75 stores the DC at a high voltage level. The choke 76 limits the surge currents through the SCR 78 and self-commutates said SCR after an inverter of the static switch is replaced by the other in operation. The self-commutation of the SCR 78 is accomplished in conjunction with the capacitor 75 during the first half cycle of the LC product of the choke 76. The capacitor 75 determines how much commutation capability is available to turn OFF the SCR 45 of FIG. 3. After the half cycle is reached, the SCR 78 becomes reverse-biased and, since said SCR is initially pulse fired, said SCR is self-commutated. The AC output voltage of the inverter 11 or 14 is applied to the input terminals 64 and 65 of the input transformer 62 and a charge is maintained across the capacitor 75.

The cathode of the SCR 78 of FIG. 4 is connected to the cathode of the SCR 45 of FIG. 3, as indicated by the terminal 79. The anodes of the diodes 69 and 73 and one terminal of the capacitor 75 of FIG. 4 are connected in common via a lead 81 and a terminal 82 to the anode of the SCR 45 of FIG. 3. The gate drives of the SCRs 45 and 78 are controlled by the flip flop circuit of FIG. 5 in a manner whereby said SCRs cannot be fired or turned ON simultaneously.

The forced commutating circuit of FIG. 4 functions in a manner wherein when it is desired to turn OFF the SCR 45 of FIG. 3, the gate drive is removed from said SCR and the SCR 78 of FIG. 4 is fired or turned ON. This results in the charge on the capacitor 75 of FIG. 4 being applied from the cathode to the anode of the SCR 45 of FIG. 3 and forcing the current back through said SCR thereby turning said SCR OFF. The resonant action of the capacitor 75 and the choke 76 then turns the SCR 78 of FIG. 4 OFF again. The SCR 78 is only fired by pulses, so that said SCR does not remain ON continuously for the entire period. This permits the switch to close again and also permits the commutating circuit to recharge. If the SCR is continuously fired, it would be impossible to reclose the interrupter.

Figure 6:
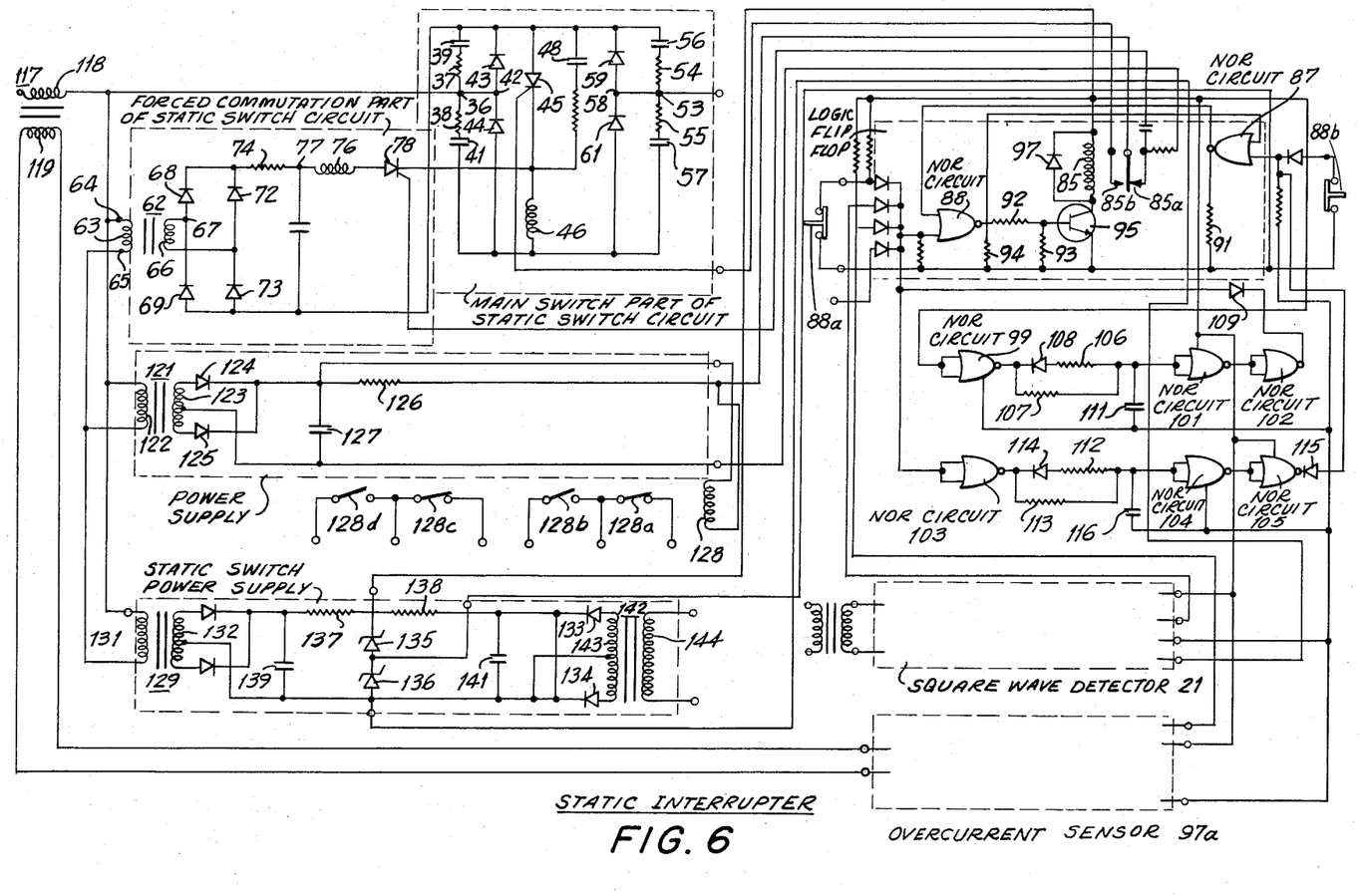
FIG. 6 is a circuit diagram of the static switch circuit of the invention including the circuits of FIGS. 2, 3, 4, and 5.

FIGS. 3 and 4 together constitute a static interrupter. The static switch comprises two static interrupters and two forced commutation circuits, as hereinbefore described. The gate electrode of the SCR 78 of FIG. 4 is coupled to the gate electrode of the SCR 45 of FIG. 3 via the terminal 79. A power source 83 is connected to the control electrode of the SCR 78 via a capacitor 84 and a relay contact 85a of a relay 85 (FIGS. 5 and 6). A resistor 86 is connected between the cathode of the SCR 78 and a common point in the connection between the capacitor 84 and the relay contact 85a. The power source 83 has a negative polarity terminal connected to one end of the resistor 86 and a positive polarity terminal connected to the other end of the resistor 86 via the relay contact 85a.

The flip flop circuit of FIG. 5 functions to prevent the SCR 45 of FIG. 3 from firing or turning ON when the SCR 78 of FIG. 4 is ON. The flip flop circuit of FIG. 5 comprises a pair of integrated NOR circuits 87 and 88 connected via a plurality of resistors 89, 91, 92, 93 and 94 as a set/reset type flip flop. A set/reset type flip flop is shown and described in the "RCA COS/MOS Integrated Circuits Manual" RCA Solid State Division, Somerville, New Jersey 08876, 1971, page 20. A NOR gate which may be utilized as NOR circuit disclosed herein is shown and described on page 19 of the aforedescribed Manual.

The NOR circuit 88 has input pins A and B and an output pin C. The NOR circuit 87 has input pins E and F and an output pin G. The inputs to the NOR circuit 88 are utilized to feed error signals from the square wave detector 21, the high speed sensor 22 and the slow AC failure detector 24 of FIG. 2, as well as connecting the pushbutton control 88a into the flip flop.

The base electrode of a transistor 95 is connected to the output pin C of the NOR circuit 88 via the resistor 92. The relay 85 is connected in series with the collector-emitter path of the transistor 95 and has the relay contacts 85a and 85b (FIG. 6). A diode 97 is connected in shunt with the relay 85 for transient suppression.

Fault indicating signals are supplied to the pin B of the NOR circuit 88 and cause the flip flop circuit to flip from one state or condition to the other. The relay 85, transistor 95 circuit is then driven by the output of the NOR circuit 88. The relay contacts 85a and 85b transfer the gate drive power from the SCR 45 of FIG. 3 to the SCR 78 of FIG. 4.

The relay contacts 85a and 85b (FIG. 6) are shown in their deenergized condition. Initially, the pushbutton 88b is depressed or opened. The flip flop is thus set to its state or condition in which the transistor 95 is energized, thereby energizing the relay 85. This causes the relay contact 85b to close and the relay contact 85a to open, thereby applying gate drive power to the SCR 45 of FIG. 3. This closes the static interrupter.

If error signals are transmitted from the square wave detector 21, the high speed sensor 22, the slow AC failure detector 24 (FIG. 2), the relay 85 is deenergized. When the relay 85 is deenergized, it permits the contact 85a to close and permits the contact 85b to open (FIG. 6). When the contact 85a is closed, it applies a gate drive pulse to the SCR 78 (FIG. 4), which then applies the charge which appears on the capacitor 75 (FIG. 4) across the SCR 45 (FIG. 3). This then force commutates the SCR 45 and opens the static interrupter.

Figure 9:
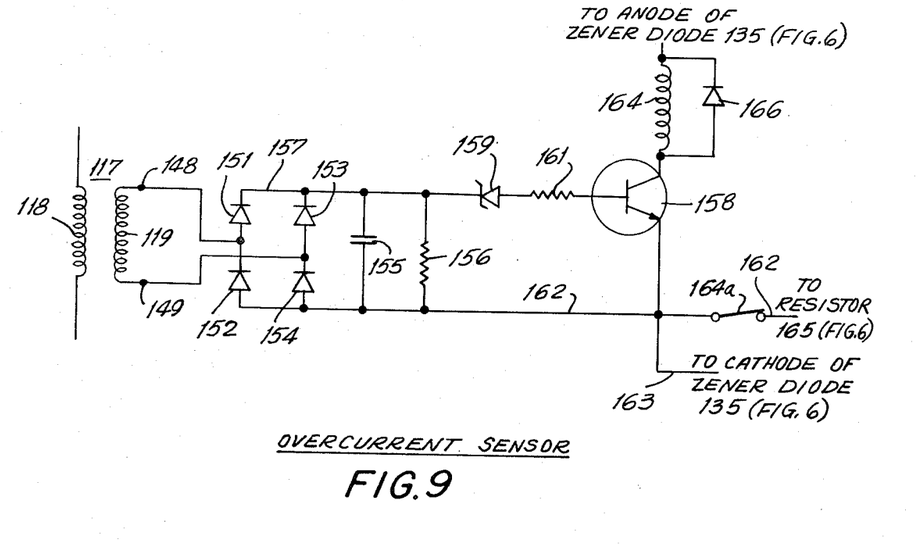

FIG. 6 is a circuit diagram of the static interrupter of the present invention and shows the interconnection of the main switch part of the static switch circuit, shown in FIG. 3, the forced commutation part of the switch circuit, shown in FIG. 4, the logic flip flop of FIG. 5 and the square wave detector 21 of FIG. 2. On a static interrupter, as shown in FIG. 6, the high speed sensor 22 and the slow AC failure detector 24 are replaced by an overcurrent sensor 97a (FIG. 9). NOR circuits 99, 101, 102, 103, 104 and 105 are utilized for proper operation of the circuit. Each of the NOR circuits, as are the NOR circuits 87 and 88, is an integrated circuit.

The NOR circuits 99, 101, 102, 103, 104 and 105 function in FIG. 6 as time delays necessary to clamp the logic in one mode or the other until the square wave transient of the square wave detector 21 disappears after either connection or disconnection. The NOR gates 99, 101 and 102, the resistors 106 and 107, the diodes 108 and 109 and the capacitor 111 lock the disconnect part of the detectors and sensor, so that when the operation is in parallel and the system is upset, the circuit 99, 101, 102, 106, 107, 108, 109, 111 provides approximately 100 milliseconds for the transient to disappear.

The NOR gates 103, 104 and 105, the resistors 112 and 113, the diodes 114 and 115 and the capacitor 116 lock out the system when the interrupter disconnects the system. The overcurrent sensor 97a is substantially a level detector circuit operating at 6 volts. A current transformer 117, having a primary 118 connected to the circuit points 36 and 42 of the main switch part of the static switch circuit and a secondary 119 connected to the overcurrent sensor 97a, provides the 6 volt level for the transistors of the overcurrent sensor to operate.

The gate drive power supply comprises a main power input transformer 121 having a primary 122 and a secondary 123, a pair of diode rectifiers 124 and 125 connected to the secondary, a resistor 126, a capacitor 127 and a relay 128. The main power for the gate drive of the closed contact part of the interrupter and the commutation part of the interrupter is provided via the input transformer 121. The resistor 126 and capacitor 127 are the pulse gate drive circuit to the SCR 78 of the forced commutation part of the static switch circuit. A relay 128 functions as an alarm to indicate to the operator the position of the static interrupter. The relay 128 has contacts 128a, 128b, 128c and 128d.

The static switch power supply provides ±12 volt power for the logic system, and comprises an input transformer 129 having a primary connected in parallel with the primaries 122 and 63 of the transformers 121 and 62, respectively, a secondary, a pair of diode rectifiers 131 and 132, another pair of diode rectifiers 133 and 134, a pair of Zener diodes 135 and 136, a pair of resistors 137 and 138, a pair of capacitors 139 and 141 and an output transformer 142 having a primary 143 and a secondary 144.

The output of the transistor 21k (FIGS. 6 and 7) of the square wave detector 21, which is normally grounded, is supplied to the logic network of NOR circuits 87 and 88 of the flip flop. The output of the flip flop thus drives the relay 85 to its deenergized condition. A pulse is thereby supplied to the commutating SCR 78. Furthermore, the overcurrent sensor 97a (FIGS. 6 and 9), which is normally grounded, permits the pulse to be supplied to the same NOR circuits when an overcurrent condition occurs, and the transistor 95 of the flip flop is again turned OFF, as hereinbefore described.

FIG. 7 shows a square wave detector. The square detector of FIG. 7 comprises an input transformer 21a having a primary winding 21b connected to the lead 27 (FIG. 2) and a secondary winding 21c having two end terminals 21d and 21e and a center tap 21f. The center tap 21f is connected to the cathode of the Zener diode 135 of FIG. 6 via a lead 21g.

A diode 21h and a resistor 21i are connected in series between the end terminal 21d of the transformer 21a and the base electrode of a transistor 21k. A diode 21m is connected between the end terminal 21e of the transformer 21a and an intermediate point 21n in the connection between the diode 21h and the resistor 21i. A capacitor 21p is connected between the center tap 21f of the transformer 21a and an intermediate point 21g in the connection between the diode 21h and the transistor 21k.

The transistor 21k has an emitter electrode directly connected to the cathode of the Zener diode 135 (FIG. 6) via a lead 21r and the lead 21g. The transistor 21k has a collector electrode directly connected to the lead 29 of FIG. 2 and connected, via a collector resistor 21s to a terminal 21t. The terminal 21t is connected to the anode of the Zener diode 135 of FIG. 6.

When the inverter produces a square wave, the diodes 21h and 21m rectify said square wave and the capacitor 21p filters the rectified signal. The filtered signal triggers, fires or switches ON the transistor 21k which clamps the lead 29 to the lead 21g which is the ground in the logic system.

When the inverter fails to produce a square wave, the transistor 21k is switched OFF and a signal is supplied from the Zener diode 136 (FIG. 6) to the flip flop circuit 26 (FIG. 2) via the terminal 21f and the lead 29.

FIG. 8 shows a high speed sensor. The high speed sensor of FIG. 8 comprises a relay having an energizing winding 22a having two end terminals 22b and 22c. The winding 22a controls a relay contact 22aa connected in series therewith to the end terminal 22c and interposed between said winding and the lead 28 of FIG. 2. The relay winding 22a also controls a relay contact 22ab.

A by-pass switch 22d is connected in shunt with the relay contact 22aa. The relay contact 22ab is connected in the lead 31 of FIG. 2 between the cathode of the Zener diode 135 (FIG. 6) and the flip flop circuit 26 (FIG. 2).

Initially, the switch 22d is instantaneously closed and then released, so that when the inverter output appears, the relay winding 22a is energized. When the relay winding 22a is energized it closes its contact 22ab, so that the flip flop 26 (FIG. 2) is held in its then condition.

When the inverter fails to produce an output, the relay winding 22a is deenergized, so that the relay contact 22ab opens and the flip flop 26 (FIG. 2) is switched to its other condition.

The relay contact 22aa functions as a holding contact for the relay and enhances its sensitivity.

FIG. 9 shows an overcurrent sensor. The overcurrent sensor of FIG. 9 comprises the input transformer 117 having a primary winding 118 and a secondary winding 119 having end terminals 148 and 149. The primary winding 118 of the input transformer 117 is connected to an inverter or power source, as in FIG. 6. A pair of diodes 151 and 152, connected in series with each other, are connected in parallel with a pair of diodes 153 and 154, connected in series with each other.

The end terminal 148 of the secondary winding 119 of the input transformer 117 is connected to a common point in the connection of the diodes 151 and 152. The end terminal 149 of the secondary winding 119 of the input transformer 117 is connected to a common point in the connection of the diodes 153 and 154. A capacitor 155 is connected in parallel with the series connected diodes 151 and 152 and 153 and 154. A resistor 156 is connected in parallel with the diodes and the capacitor 155.

A common lead 157 connects the cathode of the diode 151, the cathode of the diode 153, an electrode of the capacitor 155 and an end terminal of the resistor 156 in common and is connected to the base electrode of a transistor 158 via a Zener diode 159 and a resistor 161. The emitter electrode of the transistor 158 is directly connected to a common lead 162 which connects the anode of the diode 152, the anode of the diode 154, the other electrode of the capacitor 155 and the other end terminal of the resistor 156 in common and is connected to the cathode of the Zener diode 135 (FIG. 6) a lead 163 and is connected via a relay contact 164a, which is normally closed, to one end of a resistor 165 (FIG. 6).

The collector electrode of the transistor 158 is connected to the anode of the Zener diode 135 of FIG. 6 via a relay 164. A diode 166 is connected in shunt with the relay 164.

The transformer 117 is a current transformer having a high step up ratio which converts the current from the inverter to a voltage, which is rectified to a DC voltage by the diodes 151, 152, 153 and 154. The capacitor 155 filters the DC voltage and the resistor 156 keeps the voltage level down.

When the voltage exceeds the level of the Zener breakover, the transistor 158 is fired, triggered or switched ON, thereby energizing the relay 164 to open the lead 162 to the resistor 165. This changes the state or condition of the flip flop, so that the static interrupter goes into the disconnect mode.

When the voltage at the Zener diode 159 fails to reach the level of the Zener breakover, the transistor 158 is switched OFF and the static interrupter remains in the parallel mode.

While the invention has been described by means of a specific example and in a specific embodiment, I do not wish to be limited thereto, for obvious modifications will occur to those skilled in the art without departing from the spirit and scope of the invention.

I claim:

1. A static switch circuit for switching off a failed inverter of a power supply circuit including a pair of inverters, each driven by a DC input, and a load supplied by the inverters, said static switch circuit being connected between the inverters and the load, said static switch circuit comprising a pair of fault detecting means each having input means connected to the output of a corresponding one of the inverters and output means for detecting a fault occurring in the corresponding inverter;

a pair of interrupting means each connected between the output means of the fault detecting means and the output of the corresponding one of the inverters and the load for substantially instantaneously switching off an inverter in which a fault occurs and is detected by the fault detecting means; and a pair of forced commutation means each connected with a corresponding one of the interrupting means for reducing the period of time in which the corresponding interrupting means switches off the corresponding inverter.

2. A static switch circuit as claimed in claim 1, wherein each of the fault detecting means comprises square wave detecting means for detecting a decaying square wave in the corresponding inverter.

3. A static switch circuit as claimed in claim 2, wherein each of the fault detecting means further comprises high speed sensing means for sensing a high speed discontinuity of the output sine wave of the corresponding inverter.

4. A static switch circuit as claimed in claim 3, wherein each of the fault detecting means further comprises slow AC failure detecting means for detecting a slow AC decay.

5. A static switch circuit as claimed in claim 4, wherein each of the interrupting means comprises a silicon controlled rectifier for substantially instantaneously disconnecting the corresponding inverter from the power supply circuit upon the occurrence of a failure therein.

6. A static switch circuit as claimed in claim 5, wherein each of the forced commutating means comprises circuit means for forcing current back through the junction of the silicon controlled rectifier when said silicon controlled rectifier gate drive is removed.

7. A static switch circuit as claimed in claim 6, wherein the circuit means of each of the forced commutating means comprises a second silicon controlled rectifier.

* * * * *